3,259,623
PROCESS FOR PREPARING 2-(SECONDARY AMINO)-HALOGENOPYRIMIDINES
Ehrenfried H. Kober and Rudi F. W. Rätz, Hamden, Conn., assignors to Olin Mathieson Chemical Corporation, New Haven, Conn., a corporation of Virginia
No Drawing. Filed June 14, 1963, Ser. No. 287,755
4 Claims. (Cl. 260—247.5)

This invention relates to the preparation of certain 2-N,N-substituted amino-4,6-dihalogeno and -4,5,6-trihalogeno pyrimidines, and more particularly it is concerned with the preparation of pyrimidines having the following formula:

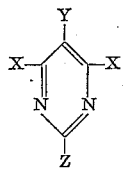

(I)

wherein Y is hydrogen or halogen, X is a halogen atom, and Z is selected from the class consisting of
(a) A heterocylic group containing a nitrogen atom in the ring, said nitrogen atom being bonded directly to the pyrimidine moiety, and
(b) A group having the structure

wherein R and R' each may be an alkyl group having 1–8 carbon atoms, a cycloalkyl group, or an aryl group.

It has been reported by Gabriel in Ber., 34, 3362 (1901) that alcoholic ammonia reacts with 2,4,6-trichloropyrimidine at 20°–100° C. to give a mixture of 2-amino-4,6-dichloropyrimidine and 4-amino-2,6-dichloropyrimidine, and at higher temperatures the same reactants yield 2,4-diamino-6-chloropyrimidine and 2,4,6-triaminopyrimidine. Winklemann in J. prakt. Chem., 115, 292 (1927) reported that ethylamine reacted with 2,4,6-trichloropyrimidine in a similar manner (mixtures obtained at the lower temperature range), but that aniline reacted with this halogenated pyrimidine at the lower temperature to yield only 4-anilino-2,6-dichloropyrimidine. King et al. in J. Chem. Soc., 1947, 726 reported that dimethylamine, a secondary amine, reacts in a similar fashion as ammonia with 2,4,6-trichloropyrimidine, that is, a mixture of 2-dimethylamino-4,6-dichloropyrimidine and 4-dimethylamino-2,6-dichloropyrimidine was obtained at room temperature. Thus, previous attempts to prepare halogenated pyrimidines having a secondary amino group in the 2-position have involved difficult separation procedures which adversely affects yield and quality of desired product.

The principal object of this invention is to provide a simple and economic method for the preparation of 4,6 dihalogeno-pyrimidines and 4,5,6-trihalogeno-pyrimidines having a secondary amino group in the 2-position.

Another object of this invention is to provide a process wherein compounds of the general Formula I can be readily prepared in high yield.

Still another object of this invention is to provide a number of heretofore unknown 2-N,N-substituted amino-halogenopyrimidines. Another object is to provide compounds characterized by biological activity and having utility in agricultural applications.

These objects have been accomplished in accordance with the present invention. It has been found that compounds having the general Formula I can be readily prepared in high purity and yield by the reaction of certain tertiary amines with 2,4,6-trihalogenopyrimidines and 2,4,5,6-tetrahalogenopyrimidines. This was a surprising result since it has been reported that halogenated pyrimidines react with tertiary amines to yield quaternary salts in which all halogens have been substituted. Furthermore, the process of this invention yields nearly exclusively the monoamino-substituted derivative even in the presence of a molar excess of tertiary amine. A number of derivatives described herein have been found to possess biological activity being particularly useful as fungicides, nematocides and as post-emergence herbicides.

The following equation illustrates the reaction involved in this invention:

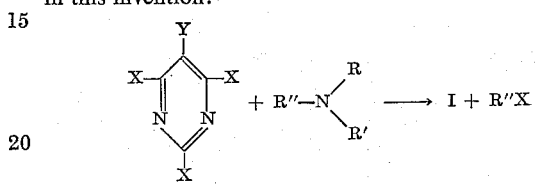

wherein X and Y are as previously represented, and R" is an alkyl group having 1–8 carbon atoms and preferably 1–4 carbon atoms. R and R' may represent alkyl groups identical with or different from R", cycloalkyl and aryl groups. Also, R and R' may jointly form a bifunctional polymethylene group —(CH$_2$)$_n$ where n is an integer from 2–6. This polymethylene chain may also be interrupted by hetero atoms, such as oxygen, nitrogen, or sulfur.

A number of halogenated pyrimidines may be employed in this process. Particularly useful are the halogen derivatives containing fluorine, chlorine, and bromine, and the use of these derivatives is preferred. Some of the 2,4,6-halogenopyrimidines and 2,4,5,6-tetrahalogenopyrimidines which may be used in the practice of this invention include 2,4,6-trichloropyrimidine, 2,4,5,6-tetrachloropyrimidine, 2,4,6 - tribromopyrimidine, 2,4,6 - trifluoropyrimidine, 2,4,5,6-tetrafluoropyrimidine, and 2,4,6-trifluoro-5-chloropyrimidine.

A number of tertiary amines can be used in the process. A requirement is that each of the amines used must contain at least one alkyl group having 1–8 carbon atoms, preferably 1–4 carbon atoms, and this requirement is illustrated in the above equation wherein R" represents such groups. R and R' may also each represent the same alkyl groups shown for R" as well as cycloalkyl groups such as, for example, cyclopentyl, cyclohexyl and cylcoheptyl. R and R' may also be aryl groups such as, for example, unsubstituted aryl hydrocarbons, e.g., phenyl, biphenyl, naphthyl; alkaryl, particularly lower alkaryl, e.g., tolyl, xylyl, ethylphenyl, propylphenyl, isopropylphenyl, butylphenyl and the corresponding alkylnaphthyl derivatives; aralkyl, particularly aryl lower alkyl, e.g., benzyl, phenylethyl, phenylpropyl, phenylisopropyl, phenylbutyl and the corresponding naphthyl derivatives; and haloaryl, e.g., chlorophenyl, bromophenyl, iodophenyl, fluorophenyl, etc.

Products having a heterocylic group in the 2-position can be prepared by the use of various N-alkyl substituted cyclic amines such as, for example, N-alkyl-pyrrolidine, -piperidine, -thiazolidine, -oxazolidine, -morpholine, -thiamorpholine, and -ethylenimine.

The process of this invention may be carried out by contacting the halogenated pyrimidines directly with the tertiary amines at temperatures of about 20° to 200° C. An equimolar ratio of the amine and the halogenopyrimidine may be used if desired. One of the novel features associated with this process is that even if a molar excess of amine is employed, no substantial amount of di-and tri-amino substitution products are obtained. It has been found that in some exceptional cases, especially when working at elevated temperatures and without a solvent, a small amount of di-amino substitution may occur when excess amine is used. In general, however, the process of this invention yields pyrimidines with amino-substituents solely in the 2-position. Lower reaction temperatures and the use of an inert solvent or diluent also insures against substitution of more than one amino group, and therefore preferred process temperatures are about 20° to 110° C. Useful solvents which may be employed in the process of this invention include, for example, benzene, toluene, the xylenes, tetraline, decaline, cyclohexane, and ligroin fractions having a boiling range of about 60° to about 200° C.

The following examples will serve to illustrate the preparation of monoamine substituted halogenated pyrimidines in accordance with the process of this invention.

Example 1

2,4,6-trichloropyrimidine (26.3 g.) was refluxed with triethylamine (62 g.) in 100 ml. of toluene for eight hours. The excess triethylamine and the toluene were removed by distillation, finally applying a slight vacuum. The oily residue was refractionated, yielding 23.38 g. (75%) of 2-diethylamino-4,6-dichloropyrimidine. This compound has a boiling point of 85°–87° C./0.7 mm. and a refractive index of $n_D^{24}$—1.5506.

*Anal.*—Calcd. for $C_8H_{11}N_3Cl_2$: C, 43.65; H, 5.04; N, 19.09; Cl, 32.22. Found: C, 43.65; H, 5.60; N, 19.22; Cl, 32.24.

Example 2

2,4,6-trichloropyrimidine (18.35 grams) and triethylamine (47 grams) were mixed without a solvent at room temperature. After about one hour, the mixture had congealed and was completely solidified after 15 hours. The solid mixture liquefied again upon standing for another day. After seven more days of standing, the mixture was diluted with ether. About five grams of an undissolved product was removed by filtration, the ether removed from the filtrate and the oily residue distilled in vacuo, yielding 18.58 grams (85 percent) of 2-diethylamino-4,6-dichloropyrimidine. The 2-diethylamino-4,6-dichloropyrimidine had a boiling point of 86°–87.5° C./1.0 mm. and a refractive index of $n_D^{26}$—1.5499.

*Anal.*—Calcd. for $C_8H_{11}N_3Cl_2$: C, 43.65; H, 5.04; N, 19.09; Cl, 32.22. Found: C, 43.65; H, 5.01; N, 19.05; Cl, 32.21.

Example 3

2,4,6-trichloropyrimidine (27.5 grams) and tributylamine (42 grams) were refluxed in 100 mls. of toluene for seven hours. The reaction mixture was worked up as described in Example 1, yielding 36.23 grams (88 percent) of 2-dibutylamino-4,6-dichloropyrimidine. This compound has a boiling point of 111°–115° C./0.3 mm. and a refractive index of $n_D^{30}$—1.5231.

*Anal.*—Calcd. for $C_{12}H_{19}N_3Cl_2$: C, 52.22; H, 6.94; N, 15.22; Cl, 25.69. Found: C, 52.14; H, 7.11; N, 15.21; Cl, 25.78.

Example 4

2,4,6-trichloropyrimidine (30.5 grams) and tributylamine (100 grams) were refluxed in 200 mls. of decaline for six hours. After removal of the excess amine and the solvent, 44.91 grams (98 percent) of 2-dibutylamino-4,6-dichloropyrimidine were distilled; B.P. 91°–99° C./0.15 mm.; $n_D^{24}$—1.5252.

Example 5

2,4,6-trichloropyrimidine (18.35 grams) and N,N-dimethylaniline (48 grams) were refluxed in 100 mls. of toluene for eight hours. After the toluene and the excess dimethylaniline had been distilled off in vacuo, the residue precipitated to a hard cake on cooling to room temperature. The crude 2-N-methylphenylamino-4,6-dichloropyrimidine (27.1 grams) was recrystallized from methanol yielding 20.7 grams (82 percent) crystals of a melting point 76°–77.5° C.

*Anal.*—Calcd. for $C_{11}H_9N_3Cl_2$: C, 51.99; H, 3.57; N, 16.53; Cl, 27.91. Found: C, 52.18; H, 3.62; N, 16.40; Cl, 27.87.

This compound is converted by melting into a form which has a melting point of 92.5°–94° C.

Example 6

The same experiment as described in Example 5 was carried out by refluxing 2,4,6-trichloropyrimidine (21.5 grams) and N,N-dimethylaniline (41 grams) in 200 mls. of decaline for five hours. The work-up yielded 28.5 grams (96 percent) of 2-N-methylphenylamino-4,6-dichloropyrimidine, M.P. 76°–78° C. from methanol and 92°–93.5° C. after melting.

*Anal.*—Calcd. for $C_{11}H_9N_3Cl_2$: Cl, 27.91. Found: Cl, 27.70.

Example 7

2,4,6-trichloropyrimidine (18.35 grams) and N-ethylpiperidine (31 grams) were refluxed in 120 mls. of toluene for eight hours. The excess N-ethylpiperidine and the toluene were removed in vacuo and the resulting residue was fractionated. The 2-piperidino-4,6-dichloropyrimidine distilled at 150°–160° C./1.6 mm., precipitating partially in the condenser. Yield: 19.3 grams or 83.5 percent of the theory. This compound was recrystallized from ethanol, yielding leaflets having a melting point of 81°–82° C.

*Anal.*—Calcd. for $C_9H_{11}N_3Cl_2$: C, 46.57; H, 4.78; N, 18.10; Cl, 30.55. Found: C, 46.38; H, 4.73; N, 17.97; Cl, 30.62.

Example 8

2,4,5,6-tetrachloropyrimidine (43.6 grams) and triethylamine (58.4 grams) were refluxed in 150 mls. of toluene for one hour. After the excess amine and the toluene had been removed in vacuo, the resulting 2-diethylamino-4,5,6-trichloropyrimidine (48.7 grams) precipitated. After recrystallization from methanol 42.5 grams (96 percent) of needles having a melting point of 78.5°–79° C. were obtained.

*Anal.*—Calcd. for $C_8H_{10}N_3Cl_3$: C, 37.75; H, 3.96; N, 16.51; Cl, 41.79. Found: C, 37.99; H, 3.91; N, 16.40; Cl, 41.67.

Example 9

2,4,5,6-tetrachloropyrimidine (11.9 grams) and tributylamine (30.0 grams) were refluxed in 100 mls. of toluene for two hours. After the excess amine and the solvent had been removed, the oily residue (16.5 grams) was fractionated. 2 - dibutylamino - 4,5,6 - trichloropyrimidine (14.17 grams or 92 percent) distilled at 136°–139° C./0.65 mm.; $n_D^{21.5}$—1.5438.

*Anal.*—Calcd. for $C_{12}H_{18}N_3Cl_3$: C, 46.39; H, 5.84; N, 13.53; Cl, 34.24. Found: C, 46.55; H, 5.92; N, 13.70; Cl, 34.08.

Example 10

The same experiment as described in Example 9 was carried out by refluxing 2,4,5,6-tetrachloropyrimidine (15.9 grams) and tributylamine (34 grams) in 200 mls. of decaline for five hours. The obtained 2-dibutylamino-4,5,6-trichloropyrimidine (18.36 grams or 82 percent) distilled at 127°–138° C./0.35 mm.; $n_D^{17}$—1.5436.

Example 11

2,4,5,6-tetrachloropyrimidine (21.8 grams) and N,N-dimethylaniline (40.6 grams) were refluxed in 100 mls. of toluene for eight hours. After the excess amine and the solvent had been removed, the residue solidified to a hard cake (31.7 grams) on cooling to room temperature. The crude 2-N-methylphenylamino-4,5,6-trichloropyrimidine was recrystallized from methanol, yielding 27.6 grams (96 percent) of crystals having a melting point of 96°–97° C.

*Anal.*—Calcd. for $C_{11}H_8N_3Cl_3$: C, 45.78; H, 2.79; N, 14.56; Cl, 36.86. Found: C, 46.15; H, 2.55; N, 14.26; Cl, 36.82.

*Example 12*

2,4,5,6-tetrachloropyrimidine (11.5 grams) and N-methylmorpholine (17 grams) were refluxed in 70 mls. of toluene for seven hours. A small amount of an insoluble by-product was filtered off and the excess N-methylmorpholine and the solvent were removed, yielding 14.2 grams (100 percent) of 2-morpholino-4,5,6-trichloropyrimidine which had a melting point of 140°–142° C. (from ethanol).

*Anal.*—Calcd. for $C_8H_8N_3Cl_3O$: C, 35.78; H, 3.00; N, 15.65; Cl, 39.61. Found: C, 35.85; H, 2.97; N, 15.29; Cl, 39.62.

*Example 13*

2,4,5,6-tetrachloropyrimidine (16.4 grams) and N-ethylpiperidine (34 grams) were refluxed in 100 mls. of toluene for five hours. The cooled reaction mixture was filtered to remove a small amount of a by-product. Then the excess N-ethylpiperidine and the toluene were removed. The residue solidified on cooling to a crystalline cake of crude 2-piperidino-4,5,6-trichloropyrimidine (20.0 grams or 99 percent) which showed a melting point of 73.5°–74.5° C. after recrystallization from ethanol.

*Anal.*—Calcd. for $C_9H_{10}N_3Cl_3$: C, 40.55; H, 3.78; N, 15.75; Cl, 39.90. Found: C, 40.51; H, 4.44; N, 15.72; Cl, 39.50.

*Example 14*

2,4,6-trifluoro-5-chloropyrimidine (33.7 grams) and triethylamine (65 grams) were refluxed in 130 mls. of toluene for six hours. After the excess amine and the solvent had been removed, the 2-diethylamino-4,6-difluoro-5-chloropyrimidine distilled at 55°–57° C./0.6 mm.

*Anal.*—Calcd. for $C_8H_{10}N_3Cl_1F_2$: C, 43.35; H, 4.55; N, 18.96; Cl, 16.00; F. 17.15. Found: C, 43.39; H, 4.64; N, 18.45; Cl, 15.99; F, 17.21.

*Example 15*

2,4,6-trifluoro-5-chloropyrimidine (8.45 grams) and N,N-dimethylaniline (43 grams) were refluxed in 75 mls. of toluene for eight hours. The excess dimethylaniline and the solvent were removed in vacuo and the obtained crude 2 - N - methylphenylamino - 4,6-difluoro-5-chloropyrimidine (6.9 grams or 53 percent) refractionated. This compound has a boiling point of 96°–105° C./0.2 mm. and a refractive index of $n_D^{27}$—1.5706.

*Anal.*—Calcd. for $C_{11}H_8N_3ClF_2$: C, 51.68; H, 3.16; N, 16.43; Cl, 13.87; F, 14.86. Found: C, 52.26; H, 3.88; N, 16.32; Cl, 13.52; F, 14.11.

The halogenated pyrimidines having a secondary amino group in the 2-position have been found to possess a high degree of biological activity. They are especially valuable for use in various agricultural applications.

The compounds having the Formula I wherein Z is selected from the group having the structure

in which R and R' each may be an alkyl group having 1–8 carbon atoms, a cycloalkyl group, or an aryl group are particularly useful as nematocides and as post-emergence herbicides.

Valuable nematocidal compositions containing these compounds as active ingredients can be prepared. For example, 2-N-methylphenylamino-4,6-dichloropyrimidine has been found to be especially effective in controlling the root-knot eelworm *Meloidogyne incognita* on tomato plants and cucumber plants. This was shown in accordance with the following procedure. The chemical was incorporated into soil heavily infested with this nematode in a container in an amount so as to provide a concentration of 0.5 gram per gallon of soil. The container was allowed to stand for one week before a tomato plant was planted in the soil. After twenty days the tomato plants were lifted and the roots washed free from soil and examined. It was found that the roots were substantially free of knots especially when compared to the roots of a tomato plant grown in infested soil but with no nematocide treatment of the infested soil.

Although the pure compounds may be used as nematocides, it is more practical and convenient to utilize them admixed with a major amount of a carrier. The word "carrier" as used herein includes liquid inert diluents as well as solid diluents suitable for mixing with the active ingredient. Water is a convenient carrier when liquid nematocidal compositions are desired, although since the aforementioned pyrimidines are relatively insoluble in water, emulsions are preferably prepared when water is used as a carrier. Thus, the pyrimidines are dissolved in a suitable organic solvent to provide concentrated solutions which can be mixed with water to form emulsions preferably using an emulsifying agent. Organic solvents can also be utilized as carriers when spraying operations are desired. Aqueous dispersions of the pyrimidines can also be utilized in treating the situs affected by the nematodes, and advantageously a dispersing agent is utilized in such formulations. The nematocides can also be admixed with various clays and applied to soils in the form of powders or dusts. These powders preferably should contain also a small amount of a wetting agent which will allow the powders to readily admix with water and form sprayable dispersions. It has been found that nematodes are best controlled by utilizing a preferred concentration of between 5 and 200 parts per million of the nematocide in the soil.

The halogenated pyrimidines of the general Formula I wherein Z represents a heterocyclic group are unusually effective fungicides. They are particularly useful in controlling and preventing the growth of plant pathogenic fungi in the soil. The effectiveness of these compounds as fungicides may be illustrated by the following procedure which may be referred to as the agar plate screening procedure.

Very dilute aqueous dispersions of 2-N-piperidino-4,6-dichloropyrimidine were prepared and added to three portions of melted potato-dextrose agar. Each portion was then poured into a Petri dish, and the concentration of the chemical in each agar portion was 250 p.p.m. When the agar cooled and solidified, each plate was planted with an agar plug cut from a growing colony of pathogenic fungi. The fungi used were *Rhizoctonia solani, Fusarium oxysporum and Pythium ultimum*. After two days of incubation the growth of the fungi in each plate was evaluated, and it was found that the fungi growth in each plate had been totally inhibited. In all test results, it has been found that the di- and tri-halogenated pyrimidines having a heterocyclic group in the 2-position are essentially equally effective fungicides, that is, the additional halogen atom does not appear to affect the fungicidal activity to any great extent. For example, testing of 2-N-piperidino-4,5,6-trichloropyrimidine in the agar plate procedure yielded results similar to the 2-N-piperidino-4,6-dichloropyrimidine test results.

Effective fungicidal compositions suitable for treating infested soil can be prepared by admixing at least one of the halogenated pyrimidines having a heterocyclic moiety in the 2-position with pest control adjuvants or modifiers to provide compositions in the form of solutions, dusts, water-dispersible powders and aqueous dispersions or emulsions. These fungicides can be used with a carrier or diluent such as a finely divided solid, an organic solvent liquid, water, a wetting agent, a dispersing agent, an emulsifying agent, an aqueous emulsion, or any suitable combination of these.

These formulations, especially the liquids and wettable powders, contain as a conditioning agent one or more surface-active agents in amounts sufficient to render the fungicides readily dispersible in water or in oil. By the term "surface-active agent," it is understood that wetting agents, dispersing agents, suspending agents, and emulsifying agents are included. A wide variety of surface-active agents can be used in these fungicidal formulations. For example, suitable agents are disclosed in Searle, U.S. Patent 2,426,417, Todd, U.S. Patent 2,655,447, Jones, U.S. Patent 2,412,510, and Lenher, U.S. Patent 2,139,276. In general, the surface-active agent should be used in amounts of about 1 percent by weight of the fungicidal compositions, although occasionally up to about 10 percent by weight of agent may be advantageously used in the formulations.

The fungicidal compositions thus prepared can be applied to soil in sufficient concentration to completely inhibit the growth of fungi pathogenic to plants. Many factors must be considered in determining optimum fungicide dosage such as, for example, what type of soil, plants, and climate conditions are involved. In general, the active ingredient should be used in amounts of between about 1 to 250 lbs. per acre of surface soil.

What is claimed is:

1. A process for preparing 2-N,N-substituted amino-halogenopyrimidines which comprises reacting a tertiary amine ($R_3N$) wherein at least one of the R substituents in said amine is an alkyl group having 1–8 carbon atoms with a compound chosen from the group consisting of a 2,4,6-trihalogenopyrimidine and a 2,4,5,6-tetrahalogenopyrimidine and recovering the 2-N,N-substituted amino-halogenated pyrimidine produced thereby.

2. The process of claim 1 wherein a reaction temperature of about 20° C. to 200° C. is utilized.

3. The process of claim 1 wherein the reaction is carried out in the presence of an inert organic diluent.

4. The process of claim 3 wherein a reaction temperature of about 20° C. to 110° C. is utilized.

References Cited by the Examiner

UNITED STATES PATENTS

| | | | |
|---|---|---|---|
| 2,853,416 | 9/1958 | Kellog | 167—33 |
| 2,861,917 | 11/1958 | Kosmin | 167—33 |
| 2,965,643 | 12/1960 | Druey et al. | 260—256.4 |
| 2,966,487 | 12/1960 | Jui et al. | 260—247.5 |

FOREIGN PATENTS

| | | |
|---|---|---|
| 174,377 | 3/1953 | Austria. |
| 763,041 | 12/1956 | Great Britain. |

OTHER REFERENCES

Kober et al., J. Org. Chem., vol. 27, pages 2509–14 (1962).

HENRY R. JILES, *Acting Primary Examiner.*

NICHOLAS RIZZO, *Examiner.*

R. L. PRICE, J. TOVAR, *Assistant Examiners.*